April 30, 1968 R. E. PORTER 3,380,286
METHOD AND APPARATUS FOR CALIBRATING UNBALANCE ANALYZERS
Filed June 11, 1965 6 Sheets-Sheet 1
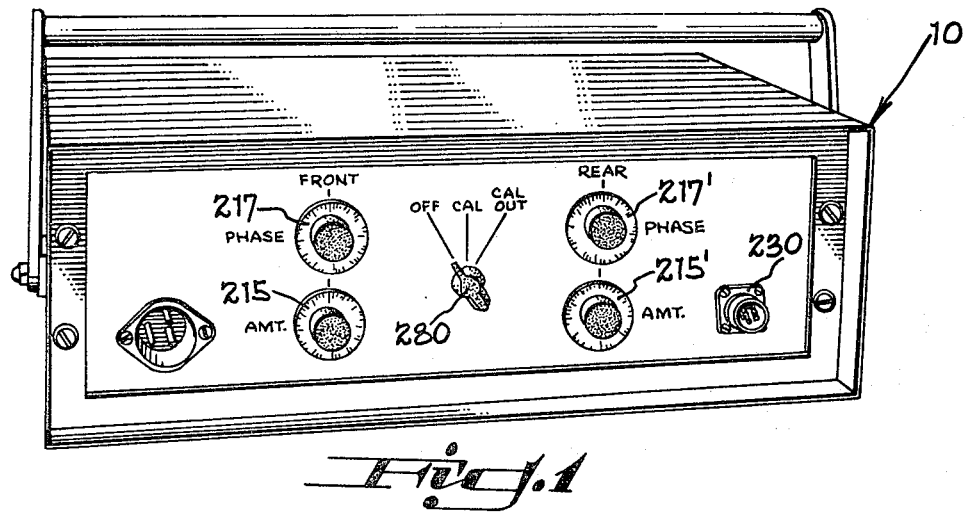
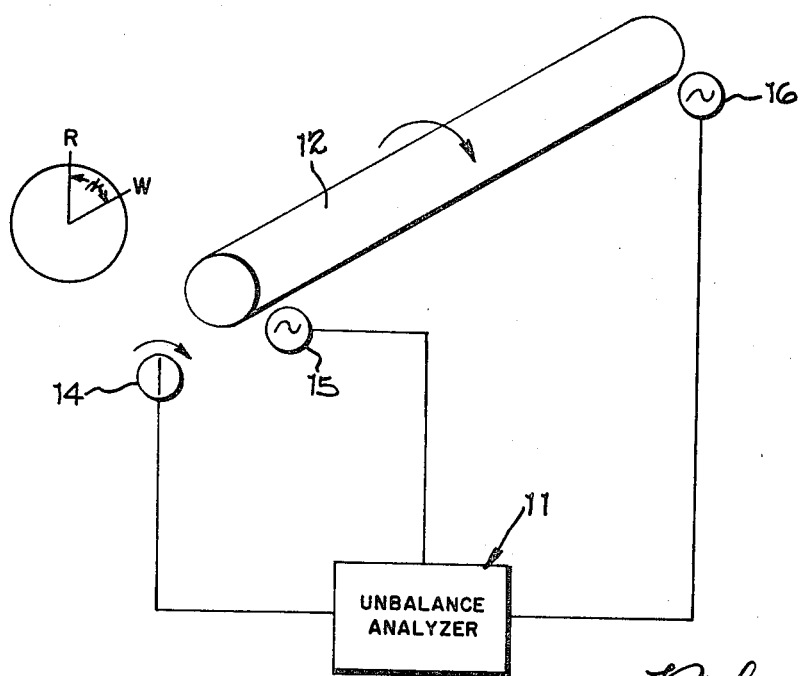
INVENTOR
Richard E. Porter
BY
Wood, Herron & Evans.
ATTORNEYS April 30, 1968

R. E. PORTER 3,380,286

METHOD AND APPARATUS FOR CALIBRATING UNBALANCE ANALYZERS

Filed June 11, 1965

INVENTOR
Richard E. Porter
BY
Wood, Herron & Evans
ATTORNEYS

April 30, 1968 R. E. PORTER 3,380,286
METHOD AND APPARATUS FOR CALIBRATING UNBALANCE ANALYZERS
Filed June 11, 1965 6 Sheets-Sheet 6

INVENTOR
Richard E. Porter
BY
Wood, Herron & Evans
ATTORNEYS

3,380,286
METHOD AND APPARATUS FOR CALIBRATING UNBALANCE ANALYZERS

Richard E. Porter, Columbus, Ohio, assignor to Abex Corporation, a corporation of Delaware
Filed June 11, 1965, Ser. No. 463,315
10 Claims. (Cl. 73—1)

This invention relates to unbalance analyzers and is particularly directed to a method and apparatus for calibrating unbalance analyzing devices.

At the present time there are in use various types of devices for analyzing the unbalance of an assembly including a rotating member; for example, the crankshaft of an engine. These unbalance analyzers can be used to determine both the amount and position of unbalance of a rotating member in either one or a plurality of correction planes. The present method of calibration and calibrating apparatus can be utilized to calibrate many of these unbalance analyzing devices.

In order, however, to provide a clearer understanding of the principles of the present calibrating method and equipment, the calibrator will be described in connection with a particular unbalance analyzer which is disclosed in detail in the copending patent application of Richard E. Porter for "Assembly Balancer," Ser. No. 449,847, filed Apr. 21, 1965. One specific assembly balancer therein disclosed includes meters for automatically indicating the amount of unbalance and the position of unbalance of a rotating member, such as an engine crankshaft, in each of two correction planes. The unbalance analyzer includes three input pickups. Two of the pickups are velocity type pickups mounted near the front and rear correction planes respectively. A third pickup is provided to provide a signal correlated with rotor speed. For example, this third pickup may comprise an induction pickup connected to a spark plug lead of the engine.

In this analyzer the complex vibration signal from each of the front and rear vibration pickups is fed to two synchronous detectors. These detectors are gated by a switching signal derived from a reference channel effective to convert the voltage or current pulses derived from the spark plug pickups to a sine wave at crankshaft frequency. The reference channel signal is then divided; one portion of the signal drives one of the synchronous detectors in the front channel and one of the synchronous detectors in the rear channel. The other portion of the signal is shifted 90° in phase and drives the other synchronous detector in each channel. This dual synchronous detection provides two DC voltage signals for each plane which are proportional to the amplitude of the 90° vector components of the unbalance vibration signal, and which are independent of engine speed.

These vector voltages are indicative of both the phase or position with respect to the reference pickup and the amount of the unbalance in both the front and the rear planes. These DC voltage signals are electronically chopped at 1000 c.p.s. and vectorially added through resolvers so that the unbalance signal for each plane appears as a 1000 c.p.s. sine wave whose amplitude is the amount of unbalance and whose phase is the position of unbalance. Even though the engine speed may vary during the balancing operation, the frequency of the unbalance signal will always be 1000 c.p.s. Thus, the cross effect correction networks are greatly simplified since they can be designed to work at a constant frequency. The necessary cross effect correction signals are summed with the unbalance signals for each channel and the resultant voltage is indicated on the "amount" and "position" meters for both front and rear correction planes at the same time.

It has been determined that once an analyzer of this type has been calibrated for a given type of engine; for example, a one hundred and fifty horsepower, six cylinder engine mounted on a particular support, the analyzer need not be recalibrated for other engines of this type analyzed while mounted in that type of support. However, the unbalance analyzer must be recalibrated for each different type of engine or other device and for each different type of mounting support.

It will, of course, be appreciated that the accuracy of all unbalance determinations made with the unbalance analyzer inherently depend upon the accuracy with which the analyzer has been calibrated initially. It will also be appreciated that in many installations, such as automobile assembly plants, it is necessary to test several different types of units, such as four, six and eight cylinder engines of different horsepower ratings so that relatively frequent calibrations are required.

Prior to the present invention these unbalance analyzers have been calibrated by highly skilled technicians utilizing time consuming trial and error methods. More particularly, in order to calibrate an unbalance analyzer it was first necessary to balance a rotor for calibration purposes. This was done by adding weights in various positions until a balance was empirically obtained. After the rotor was balanced it was necessary to add known weights sequentially, first to the front, then to the rear and then again to the front correction planes to calibrate the meters for these planes and to provide correction for cross plane effects. This cut and try balancing operation and subsequent operations not only required a higher degree of skill, but also required a substantial amount of time.

It is a principal object of the present invention to provide a novel method and novel apparatus for accurately calibrating an unbalance analyzer in a minimum amount of time.

It is a further object of the present invention to provide a method and apparatus by means of which an unbalance analyzer can be calibrated by an operator having only a minimum amount of skill.

More particularly, the present invention is predicated upon the concept of calibrating an unbalance analyzer utilizing any randomly selected unbalanced rotor by means of electrical signals developed by the calibrator and applied to the unbalance analyzer. These calibrating signals are selected so that they "electrically balance out" the unbalance signals sensed by the vibration pickups. In short, the first step in the present calibrating method is to adjust the calibrator so that the meters of the analyzer receive a zero input signal, which would normally correspond to a perfectly balanced rotor, even though the actual rotor utilized during calibration is in fact unbalanced.

In the next site, a known unbalance weight is attached to the rotor in one correction plane, e.g. the front correction plane. The unbalance engine analyzer controls are then manipulated so that the front correction plane amount and position meters read the correct amount and position of this unbalance. In the next step of the calibration procedure, the unbalance weight is removed and a known unbalance weight is attached to the rotor in a second correction plane. The proper analyzer adjustment controls are then manipulated so that a second set of meters corresponding to the second correction plane read the proper amount of unbalance and the correct position of the unbalance.

Next, the rear-to-front cross plane effect is compensated for by adjusting the plane separation "amount" and "position" controls in the analyzer so that the front meters read zero. As a final step, the front-to-rear cross effect correction is made. This is accomplished by re-applying the weight in the front correction plane. The front-to-rear cross effect adjustments in the analyzer are then manipulated so that the rear correction plane "amount" and "position" meters read zero. The assembly balancer is thus completely calibrated and is ready for use in analyzing any engine of the type and similarly supported with which it was calibrated.

One advantage of the present calibration method and apparatus is that it reduces the time required to calibrate an unbalance analyzer to a small fraction of the time previously required. For example, one unbalance analyzer which previously required four hours to calibrate can now be calibrated in half an hour.

A second advantage is that an analyzer can be accurately calibrated by a workman having considerably less skill than was previously required using conventional calibrating methods.

A still further advantage of the present calibrating apparatus is that it does not require that highly precise, expensive components be used in the unbalance analyzer, a necessary requirement when several unbalance analyzers are to be calibrated by matching dial readings with the first calibrated master unit.

These and other objects and advantages of the present invention will be more readily apparent from a consideration of the following detailed description of the drawings illustrating a preferred embodiment of the calibrator and one form of device with which it may be used.

In the drawings:

FIGURE 1 is a perspective view of one form of calibrator.

FIGURE 2 is a diagrammatic view showing the relationship of the three analyzer signal inputs to a rotating member.

Figure 3:
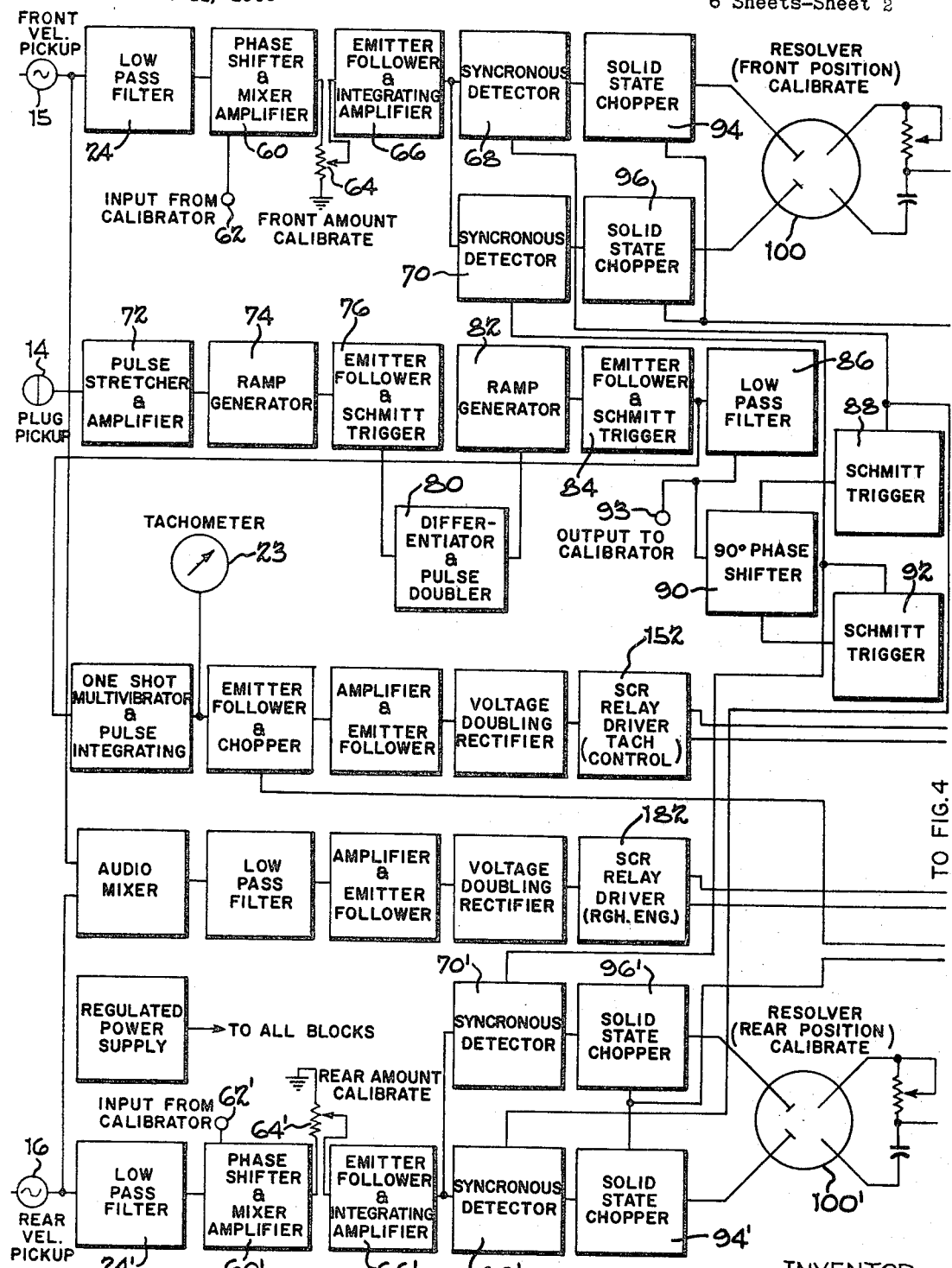
FIGURE 3 is a block diagram of a portion of one form of analyzer apparatus with which the present calibrator can be employed.

One preferred form of calibrator 10 constructed in accordance with the principles of the present invention is shown in FIGURE 1. This calibrator is shown in block form in FIGURE 5 and a complete schematic of the calibrator is shown in FIGURE 6. However, it is considered that in order to understand the principles of operation of the present calibrator and the method in which it is utilized, it will be helpful to consider one type of vibration analyzer with which the present calibrator can be used. It is to be understood that the construction and method of operation of the analyzer per se constitute no part of the present invention. Moreover, it is specifically contemplated that the present calibrator can be utilized with other types of analyzers than that diagrammatically disclosed herein. The complete details of the analyzer selected as exemplary are disclosed in the pending application of Richard E. Porter for "Assembly Balancer," Ser. No. 449,847, filed Apr. 21, 1965.

In general, an unbalance analyzer of the type adapted to be calibrated by the present calibrator is utilized to analyze vibrations of various forms of devices, including a rotating member; for example, engines, turbines, motors, pumps and the like. The manner in which such an unbalance analyzer 11 is utilized is shown diagrammatically in FIGURE 2. As there shown, the unbalance analyzer is being used to analyze the unbalance of a rotating member 12, such as an engine crankshaft, turbine or the like. The rotor shown is adapted to be connected for balance in two correction planes, a front correction plane and a rear correction plane. Accordingly, the unbalance of the rotor is sensed in these two planes. It will, of course, be appreciated that an unbalance analyzer can be employed to analyze unbalance in one, two or more planes depending upon the nature of the device being tested.

Three input connections are made from the device incorporating shaft 12 to unbalance analyzer 11. One of these connections is a rotor speed pickup 14 which is effective to provide a series of pulses or other signals whose repetition rate is proportional to rotor speed. In the specific case where member 12 is a crankshaft in an engine operating under its own power, pickup 14 is preferably a spark plug pickup consisting of a coil placed around a conductor connected to a spark plug, for example the No. 1 plug. This inductive pickup 14 provides a series of pulses with a repetition rate equal to one-half crankshaft speed. Other types of shaft speed pickups, such as photoelectric devices for sensing a mark rotating with shaft speed, proximity type pickups or contact switch type pickups, can be substituted for spark plug pickup 14 if desired. In each case, a pulse or electrical signal is periodically produced which signal is correlated with the speed of the rotating member.

In addition to the spark plug pickup 14, the analyzer includes a front vibration pickup 15 and a rear vibration pickup 16 which are attached to the engine housing adjacent to the front end of the crankshaft and the rear end of the crankshaft, i.e. adjacent to the front and rear correction planes. Each pickup, or vibration transducer, consists essentially of a dual coil electromagnetic, velocity dependent assembly mounted in an aluminum housing which is filled with a constant viscosity dampening liquid. Any suitable form of velocity-type pickup can be employed. One typical pickup is shown in T. Ongaro United States Patent No. 2,754,435. Another and preferred form of pickup is shown in Arthur Crawford pending patent application Ser. No. 449,802, filed Apr. 21, 1965, for "Vibration Pickup," now Patent No. 3,308,647.

The front and rear velocity pickups and the spark plug pickup provide input signals to an analyzer circuit indicated generally at 11 in FIGURE 2. This circuit in turn actuates five meters. Two of these meters are the front "position" meter 18 and front "amount" meter 20. Front position meter 18 indicates to the operator the angular displacement of the weight unbalance from a predetermined reference point on the flywheel. That is, this meter indicates the number of degrees X (FIGURE 2) from the reference point R to the point at which a weight W is to be added to, or removed from, the front end of the engine, for example from the front pulley or the like, in order to balance the engine. The reference point R is a mark on the flywheel which is either adjacent, or at a predetermined angular relationship, to the front pickup 15 when the No. 1 spark plug fires. The front amount meter 20 indicates the weight W in ounces, or any other convenient unit of weight measure, to be added or removed to balance the front plane of the engine.

In a similar manner, the analyzer circuit operates a rear "position" meter 21 and a rear "amount" meter 22. These meters respectively indicate the position and amount of weight to be added to, or subtracted from, the rear end, flywheel or the like. A fifth meter operated by the analyzer circuit is a tachometer 23 which indicates the speed at which the engine is running.

Figure 4:
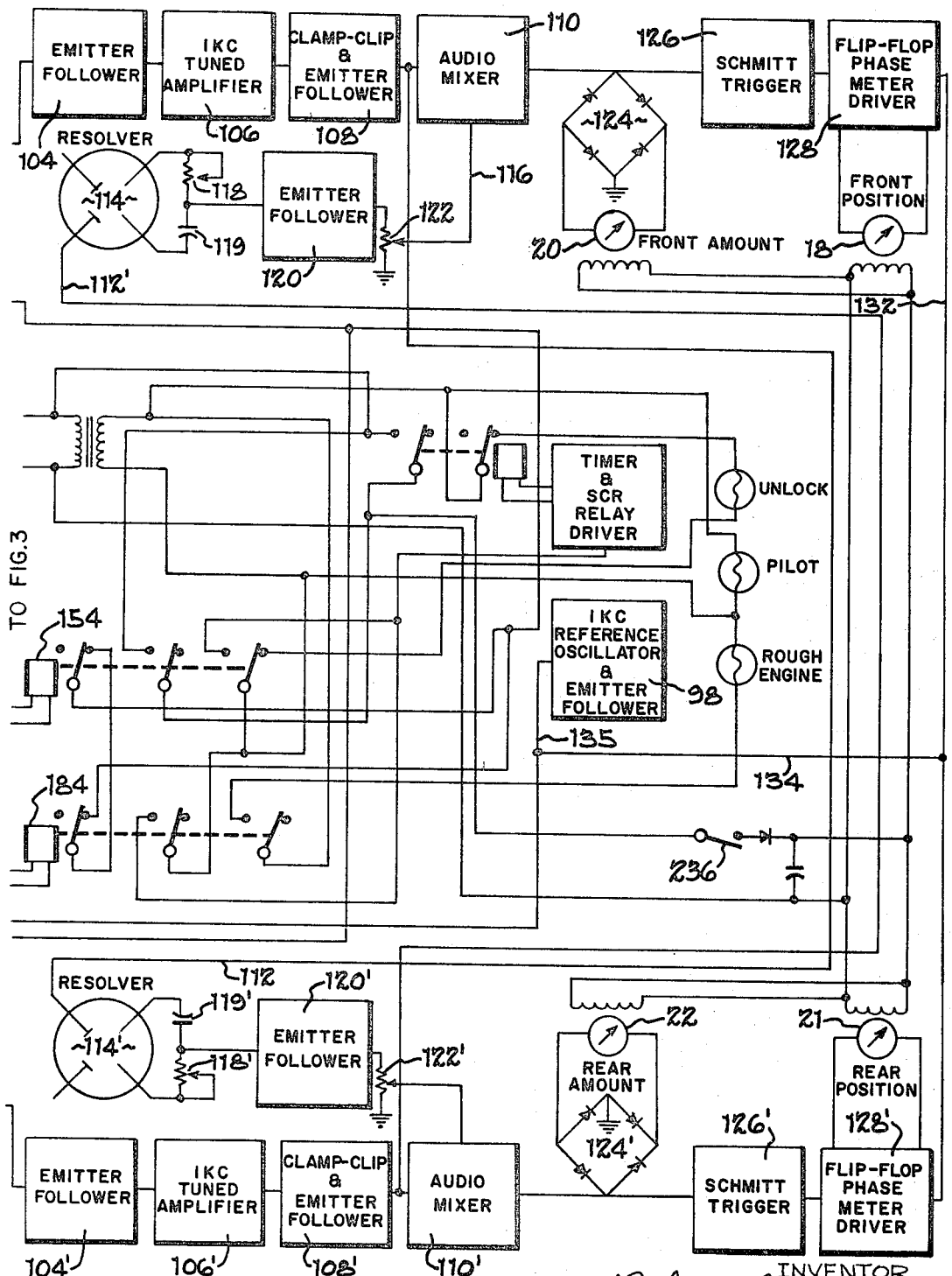
FIGURE 4 is a block diagram showing the remaining portion of the analyzer apparatus shown in FIGURE 3.

Let us now look at FIGURES 3 and 4 which show in a schematic block diagram form the components of the analyzer disclosed in detail in the above noted Porter application. As there shown, the AC vibration signal derived from the front velocity pickup 15 is applied to the M-derived low pass filter 24 which has an upper cutoff frequency of about 40 cycles per second. Because of the non-linearities introduced by the engine supports employed in a typical assembly plant, it is preferred that the engine under test be operating at a speed in the range of 1200 to 1800 r.p.m., i.e. 20 to 30 cycles per second. It will be understood, however, that other speed ranges can be employed depending upon various factors, such as the device being tested, and the manner in which the device is supported during the test.

Let us assume that the engine is running in the middle of the range at 1500 r.p.m. or 25 cycles per second. It is important that the low pass filter 24 have a sharp cutoff at its upper frequency so that at least the third harmonic of the unbalance signal, i.e. 75 cycles per second, is blocked by the filter 24. The third harmonic must be blocked since the following synchronous detectors, while effectively blocking even harmonics, are not effective to completely cancel odd harmonics.

The output of filter 24 is fed to a phase shifter and mixer amplifier circuit 60. One function of the mixer-amplifier portion of circuit 60 is to facilitate the introduction of input signals from the calibrator 10 during the calibration procedure. The second function of the circuit 60 is that of a phase shifter. More particularly, circuit 60 shifts the phase of the vibration signal picked up by unit 15 so that the phase of this signal is shifted the same amount as the phase shift introduced in the 90° phase shifter circuit 90. Thus, there is no relative shift between the signals in the reference channel and the signals in the front correction channel introduced by variation in engine speed as seen by the phase meter.

As explained in detail below, a manually controllable voltage from calibrator 10 is applied to the terminal 62 of circuit 60 during calibration of the analyzer. The output of circuit 60 is applied to a manually adjustable front amount calibrate potentiometer 64 which adjusts the output of circuit 60 to provide a predetermined indication on amount meter 20 during calibration.

The signal tapped off potentiometer 64 is applied to an emitter follower and integrating amplifier circuit 66. The emitter follower provides impedance matching and isolation and the integrating amplifier integrates the pickup velocity signal to convert it to a displacement signal. The displacement signal on the output of circuit 66 is then fed in parallel to two synchronous detectors 68 and 70. These synchronous detectors are actually electronic switches driven 90° out of phase with each other at the speed of the engine under test.

Figure 7:
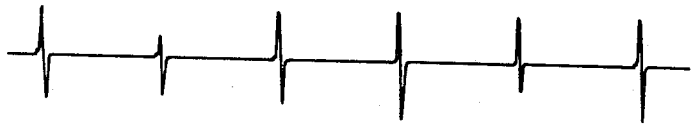
FIGURE 7 is a diagrammatic view showing the waveform of the voltage signal output of the spark plug pickup.
Figure 8:
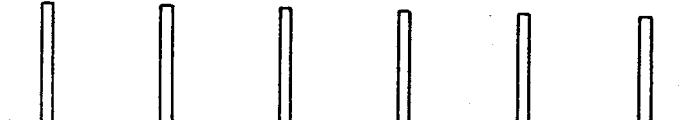
FIGURE 8 is a diagrammatic view showing the wave form of the output signal from the pulse stretcher and amplifier.
Figure 9:
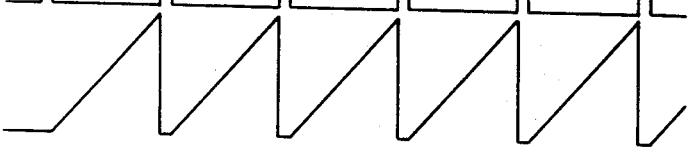
FIGURE 9 is a diagrammatic view showing the wave form of the output signal from the first ramp generator in the reference channel.
Figure 10:
FIGURE 10 is a diagrammatic view showing the wave form of the output signal from the first emitter follower and Schmitt trigger circuit in the reference channel.

Let us now look at the manner in which the synchronous detectors 68 and 70 are driven. The firing pulses picked up by the spark plug transducer 14 in the reference channel are extremely narrow and of low and varying amplitude. These pulses are shown in FIGURE 7. The output pulses from pickup 14 are fed to a pulse stretcher and amplifier 72 which stretches or widens the pulses and also amplifies them to a constant amplitude as shown in FIGURE 8. They are then feed to a ramp generator 74 which converts the pulses to a sawtooth wave form. The maximum amplitude of the teeth vary with engine speed. The sawtooth wave form is illustrated in FIGURE 9. The output signals from the ramp generator 74 drive an emitter follower and Schmitt trigger circuit 76. The emitter follower again provides impedance matching and isolation and the Schmitt trigger responds to the voltage signals to provide a well defined constant amplitude square wave corresponding in time to the plug pulses as shown in FIGURE 10.

Figure 11:
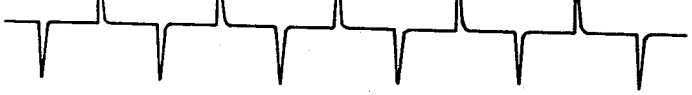
FIGURE 11 is a diagrammatic view showing the wave form of an internal signal in the differentiator pulse generator circuit after the square wave output of the Schmitt trigger has been differentiated.
Figure 12:
FIGURE 12 is a diagrammatic view showing the wave form of the output signal from the differentiator and pulse output circuit showing the manner in which alternate pulses are inverted to form a train of positive pulses.
Figure 13:
FIGURE 13 is a diagrammatic view showing the wave form of the output signal from the second ramp signal in the reference channel.
Figure 14:
FIG. 14 is a diagrammatic view showing the output signal from the second emitter follower and Schmitt trigger in the reference channel.

The square waves from circuit 76 are applied to a differentiator and pulse doubler circuit 80 which operates upon the leading and trailing edge of each square wave to provide two sharp spikes or pulses for each pulse originally sensed by plug pickup 14. These pulses are originally alternately positive and negative as shown in FIGURE 11. Subsequently, the negative pulses are inverted so that the output of circuit 80 is a train of uniform positive pulses as shown in FIGURE 12. Since the pulses at pickup 14 occur at the rate of only one for every two cycles of engine revolution, the output pulses from circuit 80 have a repetition rate corresponding to the actual speed of the engine. These sharp pulses are then applied to another ramp generator 82 to provide a sawtooth wave form at the engine frequency as shown in FIGURE 13. The output of ramp generator 82 is fed to another emitter follower and Schmitt trigger 84 which produces a square wave signal (FIGURE 14) having a frequency equal to the engine speed. The square wave signal is applied to a low pass filter 86 having a cutoff frequency of 40 cycles per second.

Figure 15:
FIGURE 15 is a diagrammatic view showing the wave form from the output of the low pass filter circuit.
Figure 16:
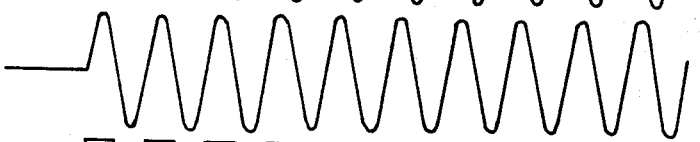
FIGURE 16 is a diagrammatic view showing the wave form of the output signal from the 90° phase shifter network.

This low pass filter converts the square wave to a sine wave as shown in FIGURE 15 and provides phase shift to the reference signal equal to that given the front and rear pickup signals by the low pass filters in those channels. The output signal from low pass filter 86 is fed to a 90° phase shifter 90 which produces two sine wave outputs separated by 90° in phase as shown in FIGURE 16. The output signals from phase shifter 90 are applied to Schmitt trigger 92 and to another Schmitt trigger 88. The output of low pass filter 86 is also applied to a terminal 93 which is adapted to be connected to calibrator 10 to provide a shaft speed reference signal as is explained in detail below.

Figure 17:
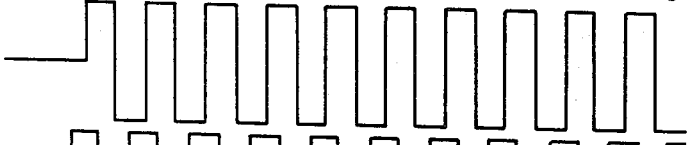
FIGURE 17 is a diagrammatic view of the wave form of the output from the Schmitt trigger circuit fed from the 90° phase shifter.
Figure 18:
FIGURE 18 is a diagrammatic view showing the wave form of the output signal from the Schmitt trigger connected directly to the low pass filter.

Schmitt triggers 88 and 92 then provide square waves 90° out of phase with each other as shown respectively in FIGURES 18 and 17. The square wave from Schmitt trigger 88 drives synchronous detector 68 and the square wave from Schmitt trigger 92 drives the synchronous detector 70. Both Schmitt triggers are switching at engine speed, i.e. 25 cycles per second. In effect, the synchronous detectors are then looking at the input rotor unbalance signal at points 90° displaced from each other. Furthermore, the synchronous detectors function as highly selective filters to pass only signals at 25 cycles per second. All even harmonics of the unbalance signal frequency are blocked by the synchronous switching action. It will be recalled that the sharp cutoff low pass filter 24 has already effectively blocked at least the third and higher harmonics of the vibration signal derived from the front pickup 15. If not filtered these odd harmonics would pass through the synchronous detectors attenuated to a fractional value corresponding to the order of the harmonic.

Besides the selective filtering action, the synchronous detectors also function to provide signals representing the vector or 90° components of the vibration unbalance signal appearing at the inputs of the synchronous detectors 68 and 70. These component signals actually appear as DC levels on the outputs of the synchronous detectors. For example, if the position of the unbalance were such that the angle X equals zero, one synchronous detector would have a maximum DC output and the other synchronous detector would have a zero DC output. If the angle X were 45°, both synchronous detectors would have the same DC level output. If the angle were 90°, the first synchronous detector would have a zero output and the second synchronous detector a maximum output.

In order to render the DC levels usable in subsequent circuitry, they are chopped or modulated at the rate of 1000 cycles per second. Chopping is accomplished by feeding the output of synchronous detector 68 to a solid state chopper 94 and the output of synchronous detector 70 to a solid state chopper 96. These choppers are also driven via conductors 99, 101, 103, 105 and 107 by the output of a 1 kc. reference oscillator circuit 98.

It is now desired to combine the two outputs of the solid state choppers 94 and 96 into one alternating current signal. These outputs are vectorially combined in an induction resolver 100. The details of one suitable form of resolver are disclosed in a "Resolver Handbook" published by Reeves Instrument Corporation Rico Bulletin #57. Resolver 100 in conjunction with potentiometer 102 and capacitor 109 functions to vectorially combine the two vector component signals from choppers 94 and 96 to a single AC signal whose amplitude is proportional to the amount of unbalance W and whose phase relative to the output of the 1 kc. reference oscillator is proportional to the unbalance position or angle X. The resolver rotor can be adjustably moved relative to the stator to provide position calibration during the set-up procedure.

The AC output of resolver 100 is fed to an isolating and impedance matching emitter follower stage 104 whose output is fed to a 1000 cycle sharply tuned amplifier 106. The output of this amplifier is a very clean 1000 cycle sinusoidal signal representing the amount and position information sensed by the front velocity pickup 15. This signal is further shaped by a clamp-clip and emitter follower circuit 108. The clamp-clip circuit provides symmetrical clipping when too large (offscale) a signal is applied to the input. This prevents great error in the position meter readings for such overloading signals. Signals from circuit 108 are fed to one input of an audio mixer 110 and also via a conductor 112 to a phase shifting resolver 114' in the rear channel of the analyzer. The 1 kc. signal is also mixed in the audio mixer 110 with a rear-to-front cross effect correction signal derived from the rear channel via a conductor 116 connected to another input of audio mixer 110.

This rear-to-front cross effect signal is derived from the clamp-clip and emitter follower circuit 108' in the rear channel. The 1 kc. rear plane unbalance signal from circuit 108' is applied via a conductor 112' to a resolver 114 which functions as an adjustable phase shifter. The rotor of resolver 114 is adjusted to vary the position or phase of the rear-to-front cross effect correction signal applied to the front channel. The correction signal is applied through a phase shifting network 118 and 119 on the output of resolver 114 to an impedance matching and isolating emitter follower stage 120. Potentiometer 118 and capacitor 119 function as a 90° phase shift circuit in which the resistance of potentiometer 118 is made equal to the reactance of capacitor 119 at the chopping frequency so that the two signals from the output windings of the induction resolver are vectorially combined.

An adjustable potentiometer 122 is used to vary the amplitude or amount of the correction signal applied via conductor 116 to the audio mixer 110. This correction signal is mixed with the front unbalance signal from circuit 108 in order to correct the 1000 cycle front channel signal for cross effect, i.e. for unbalance vibrations sensed by the front velocity pickup 15 but attributable to an unbalance in the rear correction plane rather than in the front correction plane. The cross effect is determined during the calibration of the analyzer and the operator adjusts the resolver 114 and potentiometer 122 to provide a correction signal of the proper phase and amplitude to compensate for the cross effect.

The corrected 1000 cycle front unbalance signal is applied across a fullwave diode bridge rectifier 124 which is connected to the DC voltmeter 20 which is calibrated to indicate the front amount or weight W in ounces.

The output of mixer 110 is also applied to a Schmitt trigger 126 which converts the 1 kc. sinusoidal signal to a 1 kc. square wave signal which in turn is applied to flip-flop phase meter driver 128. Also applied to driver 128 via conductors 132, 134 and 135 is the 1 kc. square wave output from the reference oscillator and emitter follower circuit 98. Flip-flop phase meter driver circuit 128 functions to compare the phase of the output from Schmitt trigger 126 with the phase of the reference 1 kc. signal from reference oscillator 98 to produce a signal which is proportional to the difference in phase of the two square wave signals. This signal is applied to the meter 18 which indicates the front position corresponding to the angle X or the position with respect to the reference point R where the weight W must be placed to balance the engine.

The rear channel components connected between the rear velocity pickup 16 and the rear amount meter 22 and rear position meter 21 are identical in structure and function to the components of the front channel and consequently will not be discussed in detail. The rear channel components carry the same reference numerals followed by a prime as their corresponding components in the front channel. Furthermore, the cross effect correction circuits in the rear channel are identical to that of the front channel. In other words, the rear velocity pickup 16 will sense some unbalance vibrations which are attributable to an unbalance in the front correction plane. Consequently, the rear unbalance signal appearing at the output of the clamp-clip and emitter follower circuit 108' is mixed in the audio mixer 110' with a front-to-rear cross effect correction signal derived from the front channel via conductor 112. The correction signal is applied to a phase shifting resolver 114' which adjusts the phase of the correction signal to compensate for the position or angle of the cross effect. The corrected signal is applied through the emitter follower stage 120' and potentiometer 122' to the audio mixer 110' where it is mixed with the 1 kc. rear unbalance signal to produce a resultant or corrected rear unbalance signal. Potentiometer 122' may be adjusted to vary the amount of the cross effect correction signal applied to the rear channel.

In the particular embodiment being discolsed, the engine speed is desirably maintained within the range of 1200 to 1800 r.p.m. before the analyzer circuit is activated. The analyzer circuit is automatically controlled so that it is disabled when the engine is running outside of this speed range.

In general, this control is effected through solenoid 154 which is energized by SCR relay driver 152. Since this portion of the analyzer circuit is not utilized during calibration, it is not disclosed in detail here. However, a complete description of this circuit is contained in the Porter application referred to above.

The particular analyzer disclosed is also disabled when the engine roughness exceeds a predetermined level. The circuit for accomplishing this includes a relay driver 182 and solenoid 184. Again, this portion of the circuit is not utilized during calibration so that it is considered unnecessary to describe the circuit in detail.

Figure 5:
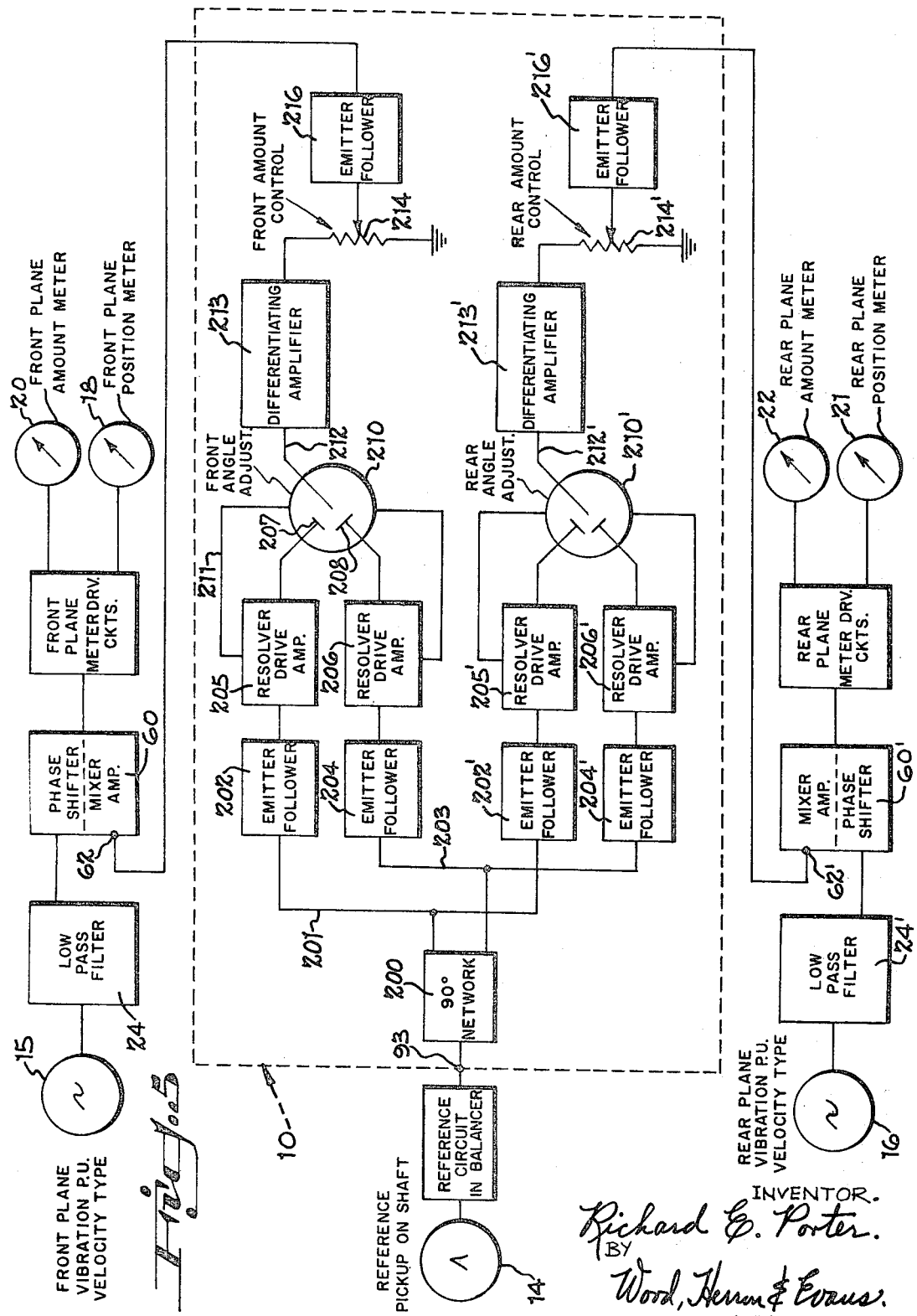
FIGURE 5 is a block diagram showing the present calibrator and showing the manner in which the calibrator is connected to an analyzer of the type shown in FIGURES 3 and 4.
Figure 6:
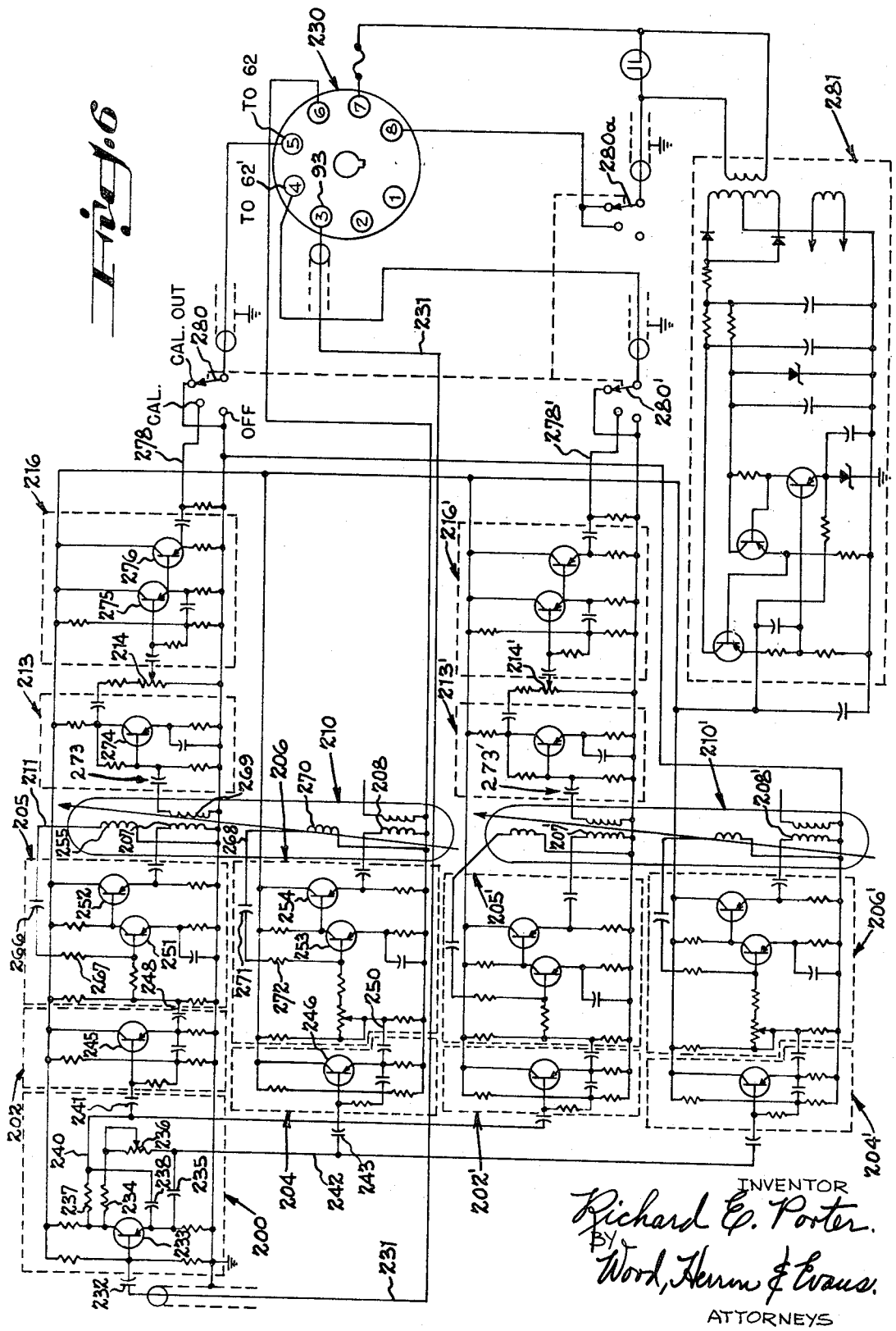
FIGURE 6 is a schematic circuit diagram of the present calibrator.

The overall construction of a preferred form of calibrator is best shown in FIGURES 1 and 5. FIGURE 5 is a block circuit diagram showing the principal components of calibrator 10 together with the main components of the front and rear channels of the unbalance analyzer. More particularly, as is shown in FIGURE 5, the calibrator 10 is provided with one input connection 93 from the reference channel of the balancer. The input signal received at terminal 93 actually is obtained from low pass filter 86 (FIGURE 3) and is in the form of a sine wave of constant amplitude as shown in FIGURE 15. This sine wave has a frequency equal to engine speed and has a phase shift equal to the phase shift imparted to the front and rear pickup signals by the low pass filters 24 and 24' in those channels.

The signal from terminal 93 is applied to a 90° phase shifter network 200. This 90° phase shift network produces two sine wave output signals separated by 90° in phase. These two sine wave outputs are respectively applied through lead 201 to emitter followers 202 and 202' and through lead 203 to emitter followers 204 and 204'. It is to be understood that emitter followers 202 and 204 form components of a circuit for applying a calibration voltage to the "front" channel of the analyzer, while emitter followers 202' and 204' form components of a circuit for applying a calibration voltage to the "rear" channel of the analyzer. Since the calibrator circuits for applying signals to the "front" and "rear" channels of the analyzer are identical, only the calibration circuit connected to the analyzer "front" channel will be described in detail. The corresponding components of the calibrator circuit connected to the analyzer "rear" channel will be given the same reference numerals with the use of a prime.

Emitter followers 202 and 204, to which signals are applied from phase shifter network 200, provide high impedance isolation. The outputs from these emitter followers are applied to resolver-drive amplifiers 205 and 206. The resolver-drive amplifiers are respectively connected to coils 207 and 208 of a compensated induction resolver 210. One suitable form of resolver is produced by Reeves Instrument Corporation and is identified as a "Reeves-Type R602 Model 101" compensated resolver. Details of construction and the theory of operation of these resolvers is disclosed in a "Resolver Handbook" published by Reeves Instrument Corporation. It will be noted that a feedback loop 211 is provided from the resolver 210 to drive amplifier 205. This feedback loop provides a more constant frequency response over a broad frequency range to prevent phase and amplitude distortion in the resolver output.

Induction resolver 210 is used solely as a phase shift device. By means of this resolver, the phase of the output signal through lead 212 can be selectively shifted. This is accomplished by turning knob 217 attached to the resolver rotor. Compensated resolver 210 is effective to maintain the amplitude of the output signal in line 212 constant while the phase of that signal is adjusted. The output signal from resolver 210 is applied through lead 212 to a differentiating amplifier 213. This differentiating amplifier differentiates the input signal and is effective to produce a velocity-type signal which is similar to the output signals produced by velocity-type pickups 15 and 16 of the analyzer.

The characteristic of a velocity-type pickup is to produce a larger signal for a higher frequency of vibration even though the vibration is of constant amplitude. The differentiating amplifier 213 produces an output signal having this same characteristic so that the output of mixer amplifier 60 will be independent of frequency changes. The output signal from differentiating amplifier 213 is applied through a front control potentiometer 214 controlled by knob 215 (FIGURE 1) to an emitter follower 216. This emitter follower provides a high input impedance for assuring proper operation of potentiometer 214 and a low output impedance for applying a signal to the terminal 62 of mixer amplifier 60 in the front channel of the analyzer.

It is to be understood that the signal from low pass filter 24 is applied to the phase shifter portion of the circuit 60 which is ahead of input terminal 62. This phase shifter component of circuit 60 functions to shift the front pickup signal passed by filter 24 an amount equal to the amount that the signal from the calibrator at terminal 62 is shifted with frequency. This phase compensation is required due to the fact that the two output signals from phase shift network 200, while they remain 90° apart for different shaft speeds or input frequencies, nevertheless shift in unison with frequency so that the resultant of the two signals also tends to shift phase. As was indicated above, a signal is similarly applied to terminal 62' of the mixer amplifier portion of circuit 60' in the rear channel of the analyzer. The phase of the output signals applied to terminals 62 and 62' can be independently adjusted in resolvers 210 and 210' by rotating control knobs 217 and 217'. Similarly, the amplitude of the output signals applied to 62 and 62' can be independently adjusted by adjusting potentiometers 214 and 214' by rotating control knobs 215 and 215'. Thus, the calibrator is effective to apply to the front and rear channels of the analyzer sine wave signals effective to cancel out the fundamental frequency of the vibration pickup signals and keep these pickup signals cancelled even if the speed of the device varies. (The harmonics of these vibration pickup signals are taken out in the low pass filters 24 and in the synchronous detectors of the balancer.)

The circuit details of the calibrator are best shown in FIGURE 6. As there shown, the input connection 93 to the calibrator from the reference channel of the analyzer is actually made through a pin on connector 230. This connector is mounted on the front panel of the calibrator unit as shown in FIGURE 1 and is adapted to be joined to a cooperating female connector attached to a multi-conductor cable which is similarly joined to the analyzer unit.

Pin 93 is connected through lead 231 and capacitor 232 to the base of transistor 233 forming part of 90° phase shifter network 200. This 90° phase shifter network, in addition to transistor 233, comprises two R-C networks. One R-C network includes a fixed resistor 234, capacitor 235 and potentiometer 236. The second R-C network includes fixed resistor 237 and capacitor 238. This second R-C network is connected via lead 240 and capacitor 241 to emitter follower 202. The first R-C network is connected through lead 242 and capacitor 243 to emitter follower 204.

Again, it will be pointed out that only the portion of the calibrator circuit joined to the "front" channel of the analyzer will be described in detail. The calibrator includes a second identical circuit adapted to be joined to the "rear" analyzer channel. The components of this latter portion of the calibrator circuit are given corresponding numbers with primes, but the components are not described in detail.

The signals applied to emitter followers 202 and 204 from the 90° phase shift circuit 200 are always 90° out of phase with one another. This 90° phase relationship is obtained through the adjustment of potentiometer 236. Emitter follower circuits 202 and 204 are identical. Each includes an emitter follower transistor numbered 245 and 246 respectively which is a matching and isolation device. The outputs of emitter followers 202 and 204 are capacitively coupled to input leads 248 and 250 of resolver-driver amplifiers 205 and 206 respectively.

Amplifier 205 includes transistor 251, the collector of which is coupled to the base of transistor 252. The output of amplifier 205 is capacitively coupled to a winding 207 of induction resolver 210. Similarly, amplifier 206 includes transistor 253, the collector of which is coupled to the base of transistor 254. The output of the second driver amplifier 206 is capacitively coupled to winding 208 of resolver 210.

A feedback loop 211 is provided from winding 255 in resolver 210 to the base of transistor 251. This feedback loop includes capacitor 266 and resistor 267. A similar feedback loop 268 is provided from winding 270 of resolver 210 to the base of transistor 253. This second feedback loop includes a capacitor 271 and resistor 272.

As was indicated previously, one preferred form of induction resolver 210 is a compensated resolver sold by Reeves Instrument Corporation and identified as "Type R602 Model 101." Essentially, this resolver comprises two input stator windings 207 and 208. These windings are physically displaced 90° from one another. The resolver further includes two rotor windings of which only rotor winding 269 is utilized. The voltage induced in winding 269 is the vector sum of the input voltages applied to stator windings 207 and 208. The phase angle of the output signal from winding 269 can be changed by changing the rotor angular position relative to the stator windings using knob 217.

Resolver 210 further includes two compensating windings 255 and 270 inserted within the stator slots. These compensating windings provide feedback voltages for loops 211 and 268 connected to driver amplifiers 205 and 206. As indicated previously, these feedback circuits provide a flatter frequency response preventing phase distortion in the resolver over a wide range of frequencies.

The output from resolver 210 is coupled to capacitor 273 of differentiating amplifier 213. The size of this capacitor is selected so that it, in combination with the input impedance of amplifier 274, will give a 6 db per octave increase in voltage with an increase in frequency of the input signal. The output of the differentiator amplifier is developed across potentiometer 214. This potentiometer is the front amount adjust potentiometer which is controlled by knob 215.

The tap of potentiometer 214 is connected to emitter follower 216. This emitter follower includes transistors 275 and 276. The input stage of the emitter follower is a high impedance stage while the output stage of the emitter follower is a low impedance stage. The output of emitter follower 216 is taken from the emitter of transistor 276 and is applied to lead 278. This lead is adapted to be connected to input terminal 62 of the analyzer through a three-position calibration switch 280. The calibration switch is effective when in the "calibrate" position to interconnect terminal 62 of the analyzer with output lead 278 of the calibrator.

Calibration switch 280 has a second deck 280' which is similarly effective to connect lead 278' of emitter follower 216' to terminal 62' in the rear channel of the analyzer. A third deck of calibrator switch 280 indicated by the numeral 280a in FIGURE 6 is effective to connect the transistorized regulated power supply circuit 281 to a source of AC voltage. The regulated power supply circuit 281 is a conventional circuit and it is not considered necessary to describe this circuit in detail. The function of the regulated power supply is to provide regulated DC to the various circuits of the calibrator.

In calibrating an engine unbalance analyzer utilizing the present method and the preferred embodiment of calibrator disclosed, the first step is to connect the engine unbalance analyzer and calibrator to a power supply source, for example, a 110 volt, 60 cycle line. The calibrator is then interconnected with the analyzer by means of a cable. This cable, joined to connector 230, effectively couples the reference channel of the analyzer to input terminal 93 of the calibrator and also couples the calibrator output leads 278 and 278' to terminals 62 and 62' of the analyzer.

The front and rear velocity pickups 15 and 16 are mounted as close to the front and rear correction planes of a rotating assembly as possible. This rotating assembly need not be balanced and hence can be selected at random from a group of assemblies of the type to be balanced. The reference signal pickup 14 is mounted to sense the rotational velocity of the rotating assembly 12. By way of example, if the rotating assembly is an engine and pickup 14 is an inductive spark plug pickup, it is secured to a selected spark plug wire. The selector switch 280 on the calibrator is then shifted to the "cal-out" position. This energizes the power supply 281, but does not connect the calibrator output leads 278 and 278' to the analyzer input terminals 62 and 62'.

Next, the front and rear plane separation amount controls 122 and 122' (FIGURE 4) of the analyzer are turned to zero so that there is no feedback signal from one plane to the other. The next step is to place the calibrator switch in the balancer unit to the "calibrate" position. This switch, which is identified by the numeral 236 in FIGURE 4, locks out or disables the locking features of the analyzer meters 18, 20, 21 and 22.

Next, the rotating assembly is rotated. For example, if the rotating assembly to be balanced is a crankshaft of an engine, the engine is started and brought up within the speed range at which the engine will ultimately be balanced. For example, for an internal combustion engine a suitable speed might be 1600 r.p.m. Preferably, the entire calibration procedure is carried out at this same speed which is in the approximate center of the speed range over which an engine may be analyzed by the unbalance analyzer.

In the next step, the front and rear unbalance amount controls (potentiometers 214 and 214') are adjusted by rotating control knobs 215 and 215' so that the front and rear amount meters of the analyzer read an appreciable amount. If the meters do not read high enough, it means that by happenstance the engine selected for initial calibration was fairly well balanced. In this case, the engine is stopped and some unbalance weight added arbitrarily.

Assuming that the front and rear amount meters do read some appreciable amount, the next step is to set the selector switch 280 of the calibrator to the "calibrate" position. This interconnects the calibrator outputs 278 and 278' with terminals 62 and 62' of the analyzer and interconnects input 93 of the calibrator to the reference channel of the analyzer.

Next, the front amount indication is nulled out. This is done by adjusting the front angle and amount controls, i.e. knobs 215 and 217 respectively. These knobs respectively adjust potentiometer 214 and the rotor of resolver 210. These controls are adjusted until the front amount and position meters of the analyzer read zero. In essence, these meters are caused to read zero because the output signal from lead 278 applied to terminal 62 of the mixer amplifier is a vector signal 180° out of phase and of equal absolute value to the signal applied to the mixer amplifier from front pickup 15. As a result, the vector sum of these two signals is zero and to the front plane and position meters it appears as though the engine is balanced in the front plane.

In the next step, the rear amount and phase meters are nulled out in the same manner by adjusting knobs 215' and 217' which set potentiometer 214' and the rotor of resolver 210'. At this point, engine unbalance has been electrically balanced out by the calibrator so that meters 20 and 22 read zero.

In the next step, the engine or other rotating member is stopped and a known weight is mounted in a known position in the front correction plane. The engine or other device is then restarted and brought to the same speed previously used; for example 1600 r.p.m.

With the calibrator still in "calibrate" position, the front plane position calibration control (rotor of resolver 100) and front plane amount control potentiometer 64 are adjusted so that the front amount and position meters 20 and 18 indicate the correct amount of unbalance and position of unbalance.

Next, the engine is stopped and the known weight is removed from the front correction plane and a known weight is added at a known position in the rear correction plane. The engine or other rotating assembly is then brought up to speed and the rear position calibration control (the rotor of resolver 100') and rear amount control (potentiometer 64') are adjusted until rear plane meters 21 and 22 read the correct position and amount of the known unbalance weight.

At this point, both the front and rear channels of the analyzer have been calibrated except for cross plane effects. Since the only unbalance (not electrically compensated for) is now in the rear correction plane, the front amount and position meters should be reading zero. In fact, however, they may not read zero because of the rear-to-front cross plane effect caused by the suspension. To compensate for this effect, the rear-to-front amount and angle controls in the analyzer are adjusted so that the front position and amount meters read zero. These controls are the rotor of resolver 114 and potentiometer 122. The only thing remaining to be done is to compensate for the front-to-rear cross effect. To accomplish this, the engine is stopped and the known unbalance weights are removed from the rear correction plane. The weights are then mounted to the front correction plane. The rear amount and position meters may now read erroneously because of the front-to-rear cross effects. This is compensated for by adjusting the rotor of resolver 114' in the analyzer and adjusting potentiometer 64'. This completes the calibration of the analyzer which can subsequently be used to analyze the unbalance of all devices of the type and suspension with which the analyzer has been calibrated.

From the above disclosure of the general principles of the present invention and the preceding description of a preferred embodiment, those skilled in the art will readily comprehend various modifications to which the invention is susceptible. Therefore, I desire to be limited only by the scope of the following claims.

Having described my invention, I claim:

1. A calibrator unit adapted to be interconnected with and to calibrate a rotating assembly unbalance analyzer of the type adapted to measure the amount and position of unbalance in a front plane and a rear plane of a rotating member of an assembly, the rotating member being driven at any speed within a range of speeds said analyzer including vibration pickups adapted to be secured to said assembly adjacent to each of said planes, and circuit means responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating member, said calibrator comprising an input connection to said reference circuit, circuit means for transforming the sine wave input from said reference circuit to two signals 90° out of phase with one another, a front plane calibration network and a rear plane calibration network, means applying said two signals to both said front plane calibration network and said rear plane calibration network, each of said networks comprising means for vectorially combining said signals to form a calibration signal, means for shifting the phase of said calibration signal and means for adjusting the amplitude of said calibration signal, whereby said calibrator is effective to produce two calibration signals of the same frequency as the rotational rate of said rotating member, said signals being respectively of opposite phase and of equal amplitude to the unbalance signals produced by each of said pickups, means vectorially adding said calibration signals to the unbalance signals applied to said analyzer by each of said pickups, said calibration signals being effective to cancel out said unbalance signals.

2. A calibrator unit adapted to be interconnected with and to calibrate a rotating assembly unbalance analyzer of the type adapted to measure the amount and position of unbalance in a front plane and a rear plane of a rotating member of an assembly, the rotating member being driven at any speed within a range of speeds said analyzer including vibration pickups adapted to be secured to said assembly adjacent to each of said planes, and circuit means responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating member, said calibrator comprising an input connection to said reference circuit, circuit means for transforming the sine wave input from said reference circuit to two signals 90° out of phase with one another, a front plane calibration network and a rear plane calibration network, means applying said two signals to both said front plane calibration network and said rear plane calibration network, each of said networks comprising a vector resolver for vectorially combining said signals to form a single calibration signal, said resolver including means for shifting the phase of said calibration signal, means for adjusting the amplitude of said calibration signal, whereby said calibrator is effective to produce two calibration signals of the same frequency as the rotational rate of said rotating member, said signals being respectively of opposite phase and of equal amplitude to the unbalance signals produced by each of said pickups, means vectorially adding said calibration signals to the unbalance signals applied to said analyzer by each of said pickups, said calibration signals being effective to cancel out said unbalance signals.

3. A calibrator unit adapted to be interconnected with and to calibrate a rotating assembly unbalance analyzer of the type adapted to measure the amount and position of unbalance in a front plane and a rear plane of a rotating member of an assembly, the rotating member being driven at any speed within a range of speeds, said analyzer including velocity-type vibration pickups adapted to be secured to said assembly adjacent to each of said planes, and circuit means responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating members, said calibrator comprising an input connection to said reference circuit, circuit means for transforming the sine wave input from said reference circuit to two signals 90° out of phase with one another, a front plane calibration network and a rear plane calibration network, means applying said two signals to both said front plane calibration network and said rear plane calibration network, each of said networks comprising means for vectorially combining said signals to form a calibration signal, means for shifting the phase of said calibration signal and means for adjusting the amplitude of said calibration signal, means for differentiating each of said calibration signals, whereby said calibrator is effective to produce two calibration signals of the same frequency as the rotational rate of said rotating member, said signals being respectively of opposite phase and of equal amplitude to the unbalance signals produced by each of said pickups, means vectorially adding said calibration signals to the unbalance signals applied to said analyzer by each of said pickups, said calibration signals being effective to cancel out said unbalance signals.

4. A method of calibrating a rotating assembly unbalance analyzer of the type utilized to balance a rotating member of an assembly while said rotating member is being driven at a speed within a selected range, said analyzer including two vibration pickups for sensing vibrations in first and second correction planes, and circuit means respectively responsive to each of said pickups for producing an electrical unbalance signal to provide an indication of the position and amount of unbalance in each of said planes, said method comprising the steps of rotating an unbalanced rotating assembly at a speed within said selected range, generating a reference sine wave having a frequency corresponding to the rate of rotation of the rotating member, sensing the unbalance in one of said planes with one of said vibration pickups, producing a first unbalance signal therefrom, utilizing said reference sine wave to generate a first calibration signal effective to cancel out said first unbalance signal, vectorially adding said signals utilizing said reference sine wave to generate a second calibration signal effective to cancel out said second unbalance signal, vectorially adding said last named signals, thereafter adding a known weight in a known position to said rotating assembly adjacent to the first correction plane thereof, rotating said assembly and sensing the unbalance thereof with one of said vibration pickups, producing a third unbalance signal therefrom, and adjusting components of said analyzer so that said analyzer indicates the correct amount and position of said added weight, removing said weight from the first correction plane, mounting a known weight in a known position upon said rotating assembly adjacent to the second correction plane thereof, rotating said assembly and sensing the unbalance thereof in the second correction plane with the other of said vibration pickups, producing a fourth unbalance signal therefrom, and adjusting components of the analyzer, whereby the analyzer indicates the correct amount and position of the added weight in the second correction plane, and adjusting components of said analyzer in a second to first cross plane circuit of the analyzer to eliminate erroneous readings of the front meter due to the second to first cross plane effect.

5. A method of calibrating a rotating assembly unbalance analyzer of the type utilized to balance a rotating member of an assembly while said rotating member is being driven at a speed within a selected range, said analyzer including two velocity-type vibration pickups for sensing vibrations in first and second correction planes, and circuit means respectively responsive to each of said pickups for producing an electrical unbalance signal to provide an indication of the position and amount of unbalance in each of said planes, said method comprising the steps of rotating an unbalanced rotating assembly at a speed within said selected range, generating a reference sine wave having a frequency corresponding to the rate of rotation of the rotating member, sensing the unbalance in one of said planes with one of said vibration pickups, producing a first unbalance signal therefrom, utilizing said reference sine wave to generate a first calibration signal, differentiating said first calibration signal, vectorially adding said differentiated signal and said first unbalance signal, utilizing said reference sine wave to generate a second calibration signal, differentiating said second calibration signal, vectorially adding said differentiated second signal and said second calibration signal, thereafter adding a known weight in a known position to said rotating assembly adjacent to the first correction plane thereof, rotating said assembly and sensing the unbalance thereof with one of said vibration pickups, producing a third unbalance signal therefrom, and adjusting components of said analyzer so that said analyzer indicates the correct amount and position of said added weight, removing said weight from the first correction plane, mounting a known weight in a known position upon said rotating assembly adjacent to the second correction plane thereof, rotating said assembly and sensing the unbalance thereof in the second correction plane with the other of said vibration pickups, producing a fourth unbalance signal therefrom, and adjusting components of the analyzer, whereby the analyzer indicates the correct amount and position of the added weight in the second correction plane, and adjusting components of said analyzer in a second to first cross plane circuit of the analyzer to eliminate erroneous readings of the front meter due to the second to first cross plane effect.

6. A method of calibrating a rotating assembly unbalance analyzer of the type utilized to balance a rotating member of an assembly while said rotating member is being driven at a speed within a selected range, said analyzer including two vibration pickups for sensing vibrations in first and second correction planes, and circuit means respectively responsive to each of said pickups for producing an electrical unbalance signal to provide an indication of the position and amount of unbalance in each of said planes, said method comprising the steps of rotating an unbalanced rotating assembly at a speed within said selected range, generating a reference sine wave having a frequency corresponding to the rate of rotation of the rotating member, sensing the unbalance in one of said planes with one of said vibration pickups, producing a first unbalance signal therefrom, utilizing said reference sine wave to generate a first calibration signal effective to cancel out said first unbalance signal, vectorially adding said signals, utilizing said reference sine wave to generate a second calibration signal effective to cancel out said second unbalance signal, thereafter adding a known weight in a known position to said rotating assembly adjacent to the first correction plane thereof, rotating said assembly and sensing the unbalance thereof with one of said vibration pickups, producing a third unbalance signal therefrom, and adjusting components of said analyzer so that said analyzer indicates the correct amount and position of said added weight, removing said weight from the first correction plane, mounting a known weight in a known position upon said rotating assembly adjacent to the second correction plane thereof, rotating said assembly and sensing the unbalance thereof in the second correction plane with the other of said vibration pickups, producing a fourth unbalance signal therefrom, and adjusting components of the analyzer, whereby the analyzer indicates the correct amount and position of the added weight in the second correction plane, and adjusting components of said analyzer in a second to first cross plane circuit of the analyzer to eliminate erroneous readings of the front meter due to the second to first cross plane effect, removing the weight from the second correction plane and adding a weight to the rotating assembly adjacent to the first correction plane, rotating said assembly and adjusting components of the analyzer so that erroneous readings in the second plane are eliminated due to the first to second cross plane effect.

7. A method of calibrating a rotating assembly unbalance analyzer of the type utilized to balance a rotating member of an assembly while said rotating member is being driven at a speed within a selected range, said analyzer including two vibration pickups for sensing vibrations in first and second correction planes, and circuit means respectively responsive to each of said pickups for producing an electrical unbalance signal to provide an indication of the position and amount of unbalance in each of said planes, said method comprising the steps of rotating an unbalanced rotating assembly at a speed within said selected range, generating a reference sine wave having a frequency corresponding to the rate of rotation of the rotating member and sensing the unbalance in one of said planes with one of said vibration pickups, producing a first unbalance signal therefrom, utilizing said reference sine wave to generate two signals 90° out of phase, combining said two signals to form a first calibration signal, varying the amplitude and phase of said calibration signal to obtain a signal which is of the same amplitude as said first unbalance signal and 180° out of phase therewith, vectorially adding said signals to cancel out said first unbalance signal, combining said two 90° out of phase signals to form a second calibration signal, adjusting the phase and amplitude of said second calibration signal to obtain a signal which is of the same amplitude as said first unbalance signal and is 180° out of phase therewith, vectorially adding said signals to cancel out said second unbalance signal, thereafter adding a known weight in a known position to said rotating assembly adjacent to the first correction plane thereof, rotating said assembly and sensing the unbalance thereof with one of said vibration pickups, producing a third unbalance signal therefrom, and adjusting components of said analyzer so that said analyzer indicates the correct amount and position of said added weight, removing said weight from the first correction plane, mounting a known weight in a known position upon said rotating assembly adjacent to the second correction plane thereof, rotating said assembly and sensing the unbalance thereof in the second correction plane with the other of said vibration pickups, producing a fourth unbalance signal therefrom, and adjusting components of the analyzer, whereby the analyzer indicates the correct amount and position of the added weight in the second correction plane, and adjusting components of said analyzer in a second to first cross plane circuit of the analyzer to eliminate erroneous readings to the front meter due to the second to first cross plane effect, removing the weight from the second correction plane and adding a weight to the rotating assembly adjacent to the first correction plane, rotating said assembly and adjusting components of the analyzer so that erroneous readings in the second plane are eliminated due to the first to second cross plane effect.

8. The combination of a rotating assembly unbalance analyzer of the type adapted to measure the amount and position of unbalance in a front plane and a rear plane of a rotating member of an assembly, the rotating member being driven at any speed within a range of speeds, and a selectively connectable calibrator unit, said analyzer including two vibration pickups adapted to be secured to said assembly adjacent to each of said planes, and circuit means responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating member, said calibrator comprising an input connection to said reference circuit, circuit means for transforming the sine wave input from said reference circuit to two signals 90° out of phase with one another, a front plane calibration network and a rear plane calibration network, means applying said two signals to said front plane calibration network and said rear plane calibration network, each of said networks comprising means for vectorially combining said signals to form a calibration signal, means for shifting the phase of said calibration signal, and means for adjusting the amplitude of said calibration signal, whereby said calibrator is effective to produce two calibration signals of the same frequency as the rotational rate of said rotating member, said signals being respectively of opposite phase and of equal amplitude to the unbalance signals produced by each of said pickups, means vectorially adding said calibration signals to the unbalance signals applied to said analyzer by each of said pickups, said calibration signals being effective to cancel out said unbalance signals.

9. The combination of a rotating assembly unbalance analyzer of the type adapted to measure the amount and position of unbalance in a front plane and a rear plane of a rotating member of an assembly, the rotating member being driven at any speed within a range of speeds, and a selectively connectable calibrator, said analyzer including two velocity-type vibration pickups adapted to be secured to said assembly adjacent to each of said planes, and circuit means responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating member, said calibrator comprising an input connection to said reference circuit, circuit means for transforming the sine wave input from said reference circuit to two signals 90° out of phase with one another, a front plane calibration network and a rear plane calibration network, means applying said two signals to said front plane calibration network and said rear plane calibration network, each of said networks comprising means for vectorially combining said signals to form a calibration signal, means for shifting the phase of said calibration signal and means for adjusting the amplitude of said calibration signal, whereby said calibrator is effective to produce two calibration signals of the same frequency as the rotational rate of said rotating member, means for differentiating said signals, said differentiated signals being respectively of opposite phase and of equal amplitude to the unbalance signals produced by each of said pickups, means vectorially adding said calibration signals to the unbalance signals applied to said analyzer by each of said pickups, said calibration signals being effective to cancel out said unbalance signals.

10. The combination of a rotating assembly unbalance analyzer of the type adapted to measure the amount and position of unbalance in a front plane and a rear plane of a rotating member of an assembly, the rotating member being driven at any speed within a range of speeds, and a selectively connectable calibrator unit, said analyzer including two vibration pickups adapted to be secured to said assembly adjacent to each of said planes, and circuit means including a low pass filter responsive to each said pickup for producing an electrical unbalance signal to provide an indication of the amount and position of unbalance in each said plane, said unbalance analyzer further comprising a reference circuit for converting a periodic pulse correlated with the rate of rotation of said unbalance analyzer to a sine wave having a frequency corresponding to the rate of rotation of said rotating member, said calibrator comprising an input connection to said reference circuit, circuit means for transforming the sine wave input from said reference circuit to two signals 90° out of phase with one another, a front plane calibration network and a rear plane calibration network, means applying said two signals to said front plane calibration network and said rear plane calibration network, each of said networks comprising means for vectorially combining said signals to form a calibration signal, means for shifting the phase of said calibration signal and means for adjusting the amplitude of said calibration signal, whereby said calibrator is effective to produce two calibration signals of the same frequency as the rotational rate of said rotating member, said calibration signals having a small phase shift with changes in frequency of said reference signal, said analyzer including means to shift the phase of said unbalance signals with changes in frequency an amount equal to the change of phase of said calibration signals with changes of frequency of said reference signal, means vectorially adding said calibration signals to the unbalance signals, said calibration signals being effective to cancel out said unbalance signals.

References Cited

UNITED STATES PATENTS

| | | | |
|---|---|---|---|
| 2,851,885 | 9/1958 | Federn et al. | 73—1 |
| 3,116,643 | 1/1964 | Sethane | 73—1 |
| 3,211,008 | 10/1965 | Ongaro et al. | 73—462 |

FOREIGN PATENTS 831,955  4/1960  Great Britain.

LOUIS R. PRINCE, *Primary Examiner.*

S. CLEMENT SWISHER, *Examiner.*